United States Patent Office 3,795,609
Patented Mar. 5, 1974

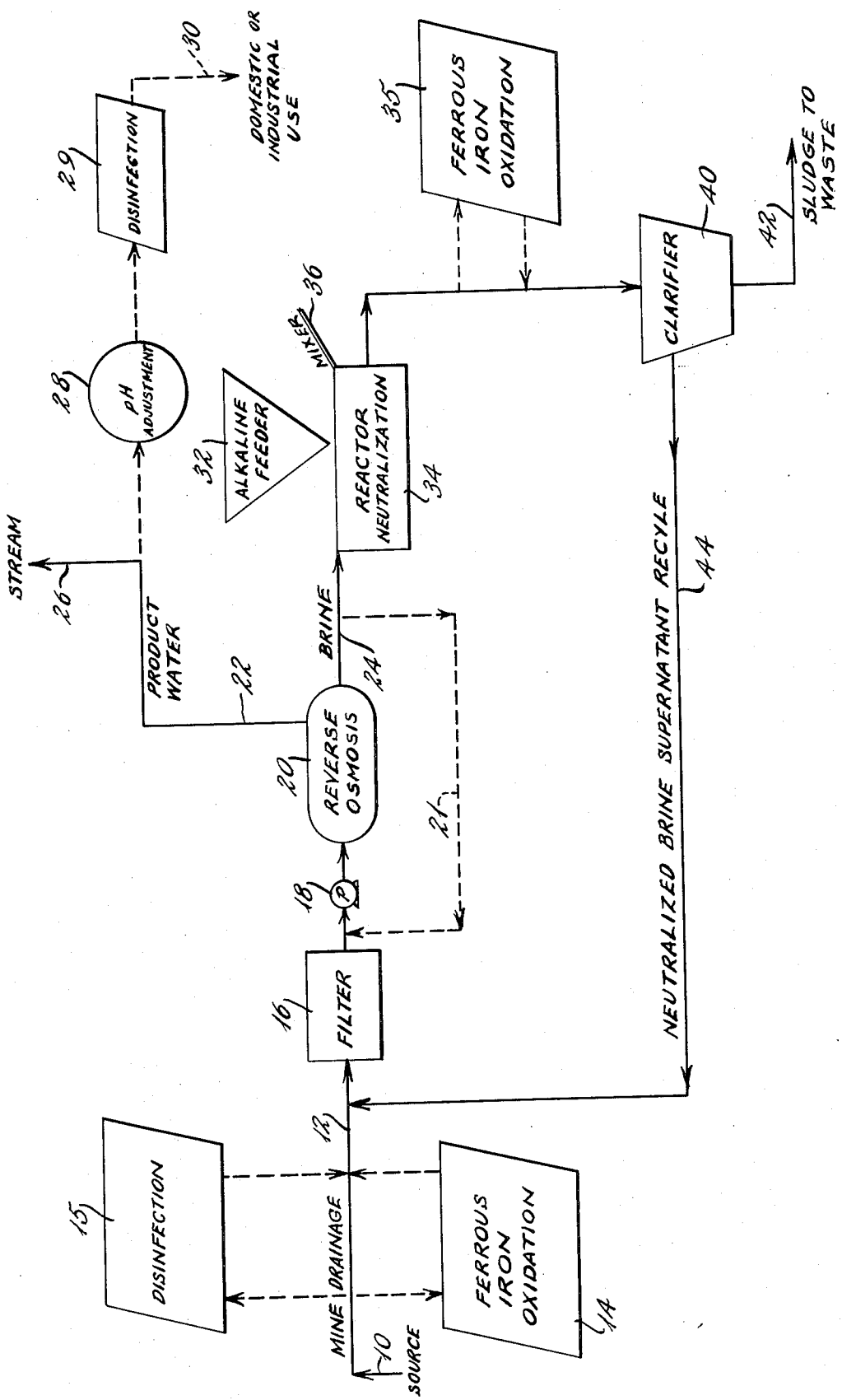

3,795,609
REVERSE OSMOSIS-NEUTRALIZATION PROCESS FOR TREATING MINERAL CONTAMINATED WATERS
Ronald D. Hill, Batavia, Ohio, and Roger C. Wilmoth and Robert B. Scott, Elkins, W. Va., assignors to the United States of America as represented by the Administrator of the Environmental Protection Agency
Filed Dec. 28, 1971, Ser. No. 213,117
Int. Cl. B01d 13/00
U.S. Cl. 210—23
15 Claims

ABSTRACT OF THE DISCLOSURE

The present invention relates to the treating of mineral matter contaminated drain waters, particularly acid mine drainage and comprises an integrated system wherein the contaminated water is optionally pre-treated to make it more suitable for reverse osmosis separation, then separated by reverse osmosis into a purified water stream containing at least about 90% of the feed water, the balance being a brine stream heavily concentrated in the mineral contaminants, thereafter chemically treating the brine stream as, for example, by neutralization to produce a sludge product and a re-cycle brine stream, the re-cycle brine stream being returned to the reverse osmosis treatment. Desirably the ultimate products of the process are purified water and a relatively small volume of inert sludge.

---

This invention relates to treatment of mineral matter contaminated water such as for example, acid mine drainage and in particular involves a procedure for separating contaminated waters into a purified water product and a relatively small volume of inert sludge. The water product has a low enough mineral content for direct discharge into natural waterways. The sludge is sufficiently inert and water insoluble for permanent disposal e.g. land fill.

The highly contaminated nature of mine drainage waters, particularly from the coal mining areas in the eastern United States, has long been recognized. A relatively small quantity of acid mine drainage affects natural run-off waters from large geographic areas, literally poisoning good sized streams and rivers. Neutralizing the acid mine drainage to reduce the acidity thereon affords some degree of decontamination but often results in water so high in hardness and sulfate content as to be unusable for domestic or industrial uses and still a serious source of mineral contamination for the natural run-off with which mine drainage ultimately becomes admixed. The disposition of acid mine waters remains an unsolved problem. Related problems exist with regard to water drainage from other types of mining operations, mineral processing plants, refuse piles, slurry ponds and to the many other instances where high mineral loading is imparted to drainage waters.

The object of the present invention is to provide a method for separating mineral matter contaminated waters into an essentially inert sludge and a purified water product.

Briefly stated, the method of the present invention involves reverse osmosis treatment of mineral contaminated water to concentrate the dissolved minerals into a small fraction of the feed stream and concomitantly to separate out at least about 50% of the water content of the feed stream as a purified water product stream capable of being safely discharged into the adjoining surface waters. In the instance of acid mine drainage, pH adjustment of the purified water product will often be required before discharge to surface waters.

The concentrated fraction or brine from the reverse osmosis treatment is chemically treated to precipitate mineral matter therefrom. In the instance of acid mine drainage, for example, chemical treatment may be with inexpensive neutralizing agents such as lime, limestone, sodium carbonate. The pH adjustment made in such brine is intended to achieve a pH level for optimum solids precipitation, rather than neutrality. Thereafter, this brine stream is clarified to remove the precipitated solids as a sludge product of the process, and the supernatant brine recycled back for reverse osmosis treatment.

Desirably the ultimate products of the present process are a purified water stream and a wet sludge sufficiently inert for permanent disposal as, for example, by landfill. As a practical matter some brine blow-down may have to be discharged as a co-product to avoid continued build-up of some non-precipitating mineral constituent to harmful levels. Not more than about 20% of the feed water will be so discharged, and usually less than about 5%. The sludge product may contain up to about 2% of the feed water. Desirably the purified product stream will contain at least about 90% of the entering waters.

In the instance of acid mine drainage, the principal dissolved mineral material present in the water are: iron, calcium, sulfate, magnesium, manganese, aluminum, and some traces of other metals. The usual ranges of acid mine drainage waters is set forth in Table I below:

TABLE I

Mine drainage composition*

| Constituent: | Range |
|---|---|
| pH | 1.5–6.5 |
| Iron, total _____mg./l__ | 0–10,000 |
| Acidity _____mg./l__ | 0–50,000 |
| Aluminum _____mg./l__ | 0–2,000 |
| Sulfate _____mg./l__ | 100–50,000 |

*Mine drainage also contains various amounts of Ca, Mg, Mn, Cu, Zn, Cd, Ni, Pb, and As.

For further understanding of the invention, reference is now made to the attached drawing wherein is diagrammatically shown a flow-sheet illustrating and exemplifying the treatment of acid mine drainage according to the practice of this invention.

The contaminated acid mine drainage waters entering from a source 10 may have to be pre-treated to insure suitability for separation by reverse osmosis. A typical pre-treatment for acid mine drainage is oxidation of ferrous ions present in the contaminated water in oxidizer 14, chemically as by ozonation, chlorination, or biologically. In addition, disinfection to control bacteria and other organisms that causes membrane fouling may be required in disinfecter 15, chemically, e.g. by chlorination, or by ultraviolet light. Suspended solids present in the contaminated mine waters are removed by passage through a filter system 16. If the drainage waters are already in an oxidized state and do not contain membrane fouling organisms, the feed stream may be passed by way of line 12 directly to filter system 16. In any event, the filtered mineral contaminated water is pressurized by pump 18, then passed through reverse osmosis unit 20 wherein the water is separated into a product water stream which passes out of the osmosis unit through line 22 and a brine stream which leaves through line 24.

The purified product water in line 22 is low enough in mineral content for discharge directly to a stream 26. If the product water is intended for direct domestic or industrial use, it may require further treatment like neutralization in pH adjustment unit 28 and disinfection in unit 29 before discharge via line 30 to its intended domestic or industrial use.

The purified product water stream leaving the reverse osmosis unit 20 by way of line 22 will constitute at least 50% of the water feed entering reverse osmosis unit 20. However, since an internal brine re-cycle forms an important part of the system as a whole, the purified product water will constitute at least about 80%, and normally more than 90% of the water input to the system from inlet 10.

The brine stream which leaves osmosis unit 20 through line 24 will then comprise less than 50%, and usually less than 25%, of the combined feed water and recycled brine entering reverse osmosis unit 20. The brine enters into (partial) neutralizer 34 wherein it is reacted with suitable alkaline material, e.g. limestone or lime, fed from hopper 32 under agitation from mixer 36. Typically acid mine wastes are relatively high in iron, in aluminum and sulfate and partial or full neutralization with inexpensive neutralizing agents like lime or limestone will cause a considerable proportion of these contaminants to precipitate from the brine. In some instances where the ferrous ion content of the feed stream is high it may be desirable to place a ferrous-to-ferric oxidation step at this stage of the process. In such instances, the slurry and precipitate pass to an oxidation unit 35 where ferrous ion is converted to ferric iron by aeration or some other oxidation process.

The slurry of brine and precipitate passes from the neutralizer 34 or oxidizer 35 via line 38 into clarifier 40, wherein the sludge is separated out from the neutralized brine stream and removed by way of line 42 to disposal. The supernatant brine is recycled from clarifier 40 through line 44 back to repeat passage through reverse osmosis separation. In the flow sequence illustrated by the drawing, recycled brine from line 44 is admixed with the feed water just ahead of filter 16.

In order to separate out as much of the contaminants as is reasonably possible in the form of an inert solid co-product without upsetting the system, the reaction in neutralizer 34 is adjusted to a pH which is optimum for the system as a whole. In the instance of acid mine drainage, neutralization to a pH of about 4.5 is believed to be optimum. If the pH were raised much nearer to neutrality some danger exists that the neutralized brine recycled from clarifier 40 by way of line 44 will cause instantaneous iron precipitation when admixed with incoming acid mine drainage waters. Any such precipitate might foul filter 16 or the membranes inside reverse osmosis unit 20.

In the flow sequence illustrated by the drawing, the only products of the separation process are the purified product water leaving in line 22 and the waste sludge leaving line 42. Allusion has already been made that the purified product water preferably constitutes in excess of 90% of the water feed entering from source 10. The balance of the water, which may be less than 2%, leaves as part of the sludge product from the clarifier 40 by way of line 42. The high water recovery rate and the separation out of mineral contaminants as an essentially inert sludge demonstrates how efficiently the procedure of the present invention can treat contaminated drainage waters.

Such complete separation of the drainage waters depends upon the nature of the mineral contaminants, and the equilibriums attained in the system. Thus the precipitation which occurs in neutralizer 34 must reduce the mineral content of the brine and desirably reduce the content of all mineral components of the brine. Also, precipitation should not occur elsewhere in the system such as, for example, in the mixture of recycled brine with feed water, nor should the concentration of any mineral component in the brine build up to the point where its presence interferes with reverse osmosis separation. Obviously the mineral concentration levels at various stages of the system in the recycled brine can be adjusted by providing for some brine blow-down. This prevents build-up of relatively minor mineral constituents to interfering levels. The refractory nature of some drainage waters may require that up to 20% of the water feed will be removed as brine blow-down. Preferably less than 5% will be so removed. Some process variations may be employed to minimize brine blow-down such as, for example, periodically reducing the purified water recovery rate in the reverse osmosis to a level low enough to clear any scale deposited therein at high recovery rates. Also the recycled brine may be maintained as a separate stream during reverse osmosis separation thereof, or admixed with feed water after partial separation of the feed water has been effected.

For still further understanding of the practice of the present invention, specific examples of practice thereunder are presented below.

The reverse osmosis unit employed in the tests described by the following examples was a 10,000 g.p.d. rated unit (Gulf Environmental Systems, Inc.) which contained 750 square feet total of membrane area. In order to insure that suspended solids did not plug the small brine channels in the reverse osmosis unit, sand filters and 10-micron cartridge filters were used to remove suspended solids from the raw feed-water and from the recycled neutralized brine.

In order to have sufficient brine flow in the reverse osmosis unit available for these tests it was necessary to recycle a substantial proportion of the brine directly from the outlet of the reverse osmosis unit back to the inlet (through direct recycle line 21).

Reverse osmosis units of the type employed in the testwork of the following examples are capable of efficiently separating acid mine drainage waters into a concentrated brine stream and a relatively pure product water. Below tabulated is a representative reverse osmosis run.

TABLE II

Typical performance data at 74.4 percent water recovery

| | Raw feed | Product water | Percent rejection |
|---|---|---|---|
| pH | 2.7 | 4.4 | |
| Conductivity, micromhos/cm | 1,350 | 55 | 97.9 |
| Acidity (CaCo₃), mg./l | 604 | 4 | 99.8 |
| Ca, mg./l | 115 | 2 | 99.3 |
| Mg, mg./l | 38 | 0.9 | 99.2 |
| Al, mg./l | 39 | 3.1 | 97.3 |
| Fe, mg./l | 153 | 0 | 100 |
| SO₄ | 936 | 4.2 | 99.8 |

The same reverse osmosis unit was also operated at 91±1% for extended periods of time. Some calcium sulfate scaling occurred but could be removed by operating the unit at 50% recovery for short periods of time to flush them from the membrane. Preferred practice of the present invention involves operating the reverse osmosis unit at high recovery rates, e.g. rates in excess of 80% water recovery.

EXAMPLE 1

The pilot plant configuration used in the tests is the system illustrated in the drawing, with brine recycle line 21 recycling brine directly from the outlet line of the reverse osmosis unit back to the inlet line where it mixed with the feed; the neutralized brine was added to the feed water downstream of the filter.

The raw acid mine drainage, 5.02 g.p.m., was pumped through a rapid sand filter and a 20-micron filter to remove suspended solids. The filtered water was then blended with 0.40 g.p.m. of recycled neutralized brine and with the direct brine recycle. The mixture was pumped to the reverse osmosis unit, which unit was operated at 91% water recovery. The 4.93 g.p.m. of product water was sampled and discharged from the system. The brine flow was split with 3.60 g.p.m. (88%) being recycled directly for blending with the filtered raw water (to maintain sufficient brine flow through the reverse osmosis unit). The remaining 0.49 g.p.m. (12%) of the brine flow was passed to a 50-gallon reactor where sufficient lime was added to raise the pH to 4.4. The neutralized water was then passed from the reactor to a 1,200-gallon upflow clarifier where the suspended solids were removed as sludge. The supernatant neutralized brine (0.40 g.p.m.) was then passed through a sand filter and recycled back for blending with the raw mine drainage. The run lasted a total of 77 hours; the details thereof and the results are tabulated below in Table III.

The raw acid mine drainage treated in the runs of this example have the following characteristics:

| | |
|---|---|
| Acidity (CaCO$_3$) _____ mg./l__ | 600 |
| Total iron (95% ferric) _____ mg./l__ | 100 |
| Calcium, Ca _____ mg./l__ | 100 |
| Magnesium, Mg _____ mg./l__ | 40 |
| Aluminum _____ mg./l__ | 40 |
| Sulfate _____ mg./l__ | 900 |
| pH _____ | 2.7 |
| Conductance _____ micromhos/cm__ | 950 |

A preliminary run was made with the reverse osmosis unit alone for 100 hours at a 91% recovery rate while the attendants were on duty and at 85% at night during the unattended hours. During the course of this run some evidence was noted of membrane fouling, probably by calcium sulfate. A temporary reduction of the recovery rate to 50% at the expiration of the run seemed to restore the capacity of the unit, apparently by a flushing effect.

The details of this preliminary run are tabulated below (Table IV):

TABLE IV.—SUMMARY OF 91 PERCENT WATER RECOVERY TEST

NOTE:
Average water recovery, percent 91.2.
Range of water recovery, percent 90.6–93.1.
Average pressure, p.s.i. 606.
Average feed water temperature, °F. 44.
Water flux rate, corrected to 10° C., gal. sq./ft./day: Start of run, 11.6, end of run 9.8, range 9.5–13.4.
Length of run, hours 100.

| | Raw water | Blended [1] feed water | Brine | Product | Tube [2] rejection, percent | Overall [2] rejection, percent. |
|---|---|---|---|---|---|---|
| Conductance mmhos./cm | 1,190 | 4,210 | 9,600 | 248 | 95 | 79 |
| pH | 2.7 | 2.2 | 2.0 | 3.4 | | |
| Acidity (CaCO$_3$) mg./l | 633 | 2,584 | 5,914 | 116 | 96 | 82 |
| Ca CaCO$_3$ mg./l | 266 | 1,206 | 2,756 | 7.5 | 99 | 97 |
| Mg (CaCO$_3$) mg./l | 134 | 750 | 1,671 | 2.8 | 99 | 98 |
| SO$_4$, mg./l | 810 | 4,024 | 9,542 | 16.8 | 99 | 98 |
| Fe, mg./l | 110 | 528 | 1,190 | 2.8 | 99 | 97 |
| Al, mg./l | 35 | 172 | 398 | 1.1 | 99 | 97 |

[1] Blended feed was the mixture of raw water and recycled brine actually pumped to the reverse osmosis unit.
[2] Tube rejection is the percent decrease in the concentrate based on the water the membranes were actually receiving, e.g., blended feed—product ×100/blended feed. Overall rejection is the efficiency of the whole process, e.g. feed water—product water ×100/feed water.

TABLE III.—SUMMARY REVERSE OSMOSIS, NEUTRALIZATION TEST

NOTE:
Raw feed water flow, g.p.m. 5.02.
Product water flow, g.p.m. 4.93.
Brine flow vessel 5, g.p.m., 4.09.
Brine flow recycle, g.p.m. 3.60.
Brine flow to neutralization plant, g.p.m. 0.49.
Neutralized brine flow recycle, g.p.m. 0.40.
Neutralized brine flow to waste (sludge), g.p.m. 0.09.
Percent of neutralized brine resulting as sludge, 22.5.
Water recovery reverse osmosis unit, percent 90.9.
Water recovery total process, percent 98.3.
Average pressure, p.s.i. 603.
Average flux corrected to 10° C., gal./sq. ft./day 10.08.
Average water temperature, °F. 47.

| | Raw feed | Blended feed water | Brine | Recycled neutralized brine | Product | Tube [1] rejection, percent | Overall [1] rejection, percent |
|---|---|---|---|---|---|---|---|
| Conductance, mmhos./cm | 945 | 3,450 | 7,890 | 2,950 | 212 | 94 | 78 |
| pH | 2.9 | 2.7 | 2.4 | 4.4 | 3.3 | | |
| Acidity (CaCO$_3$) mg./l | 372 | 1,360 | 2,880 | 72 | 106 | 93 | 72 |
| Ca (as Ca) mg./l | 76 | 438 | 900 | 1,025 | 2.1 | 99 | 97 |
| Mg (as Mg) mg./l | 32 | 152 | 335 | 457 | 1.1 | 99 | 97 |
| SO$_4$, mg./l | 606 | 3,240 | 7,050 | 3,740 | 7.3 | 99 | 99 |
| Fe, mg./l | 55 | 269 | 560 | 3.4 | 1 | 99 | 98 |
| Al, mg./l | 21 | 106 | 231 | 12 | 0.85 | 99 | 96 |

[1] Tube rejection is the percent decrease in concentrate based on the water the membranes are actually receiving, e.g., blended feed—product ×100/blended feed. Overall rejection is the efficiency of the whole process, e.g., feed water—product water ×100/feed water.

The overall 98.3% water recovery illustrates the extent to which practice of the present invention can result in but two discharge streams, i.e. product water and a small quantity of sludge which is relatively inert. Attention is directed to the nearly 50% removal of sulfate from the brine and the rather small increase in the brine calcium content even though over 2,800 mg./l. of lime as calcium carbonate was added to neutralize the acidity of the brine. Large amounts of calcium sulfate were being removed by the neutralization process.

EXAMPLE 2

In this set of tests the same arrangement of equipment was employed as in the run of Example 1.

Thereafter a first run was made with neutralization of the brine product to pH 4.7 and recycle of the clarified neutralized brine.

Neutralization reduced the acidity, aluminum, calcium, iron and sulfate sufficiently to demonstrate the possibility of long continued operation with, however, some occasional blow-down to avoid a continued build-up of some materials which do not precipitate at the acid pH such as, for example, manganese. Some membrane fouling seemed to be occurring and the reverse osmosis unit was flushed every 20 to 24 hours to restore the flux rate therein.

The total system of water recovery was 99%, i.e. 99 gallons of product water and 1 gallon sludge.

The details of this test are presented below in Table V.

TABLE V.—SUMMARY OF TEST I

NOTE:
Reverse osmosis unit water recovery, percent 91.
Total water recovery "Neutrolosis" system, percent 99.
Pressure, p.s.i. 602.
Water temperature, ° F. 58.
Raw water flow, g.p.m. 5.02.
Product water flow, g.p.m. 4.97.
Brine water flow, g.p.m. 0.48.
Neutralized brine recycled, g.p.m. 0.43.
Averaged water flux, gal./sq. ft./day at 77° F. 15.4.
Length run, hours 99.6.

|  | Raw water | Blended [1] feed | Brine | Neutralized brine recycled | Product water | Salt [2] rejection percent |
|---|---|---|---|---|---|---|
| Conductance, mmhos./cm | 1,720 | 5,160 | 10,000 | 3,680 | 335 | 95 |
| pH | 2.7 | 2.2 | 2.0 | 4.7 | 3.4 | |
| Acidity, mg./l | 647 | 2,680 | 6,030 | 462 | 130 | 95 |
| Magnesium, mg./l | 38 | 271 | 547 | 312 | 2 | 99 |
| Calcium, mg./l | 100 | 473 | 1,130 | 755 | 3 | 99 |
| Aluminum, mg./l | 38 | 187 | 405 | 65 | 1 | 99 |
| Iron, mg./l | 117 | 516 | 1,210 | 2 | 2 | 99 |
| Sulfate, mg./l | 982 | 4,680 | 11,100 | 2,160 | 21 | 99 |
| Alkalinity, mg./l | 0 | 0 | 0 | 1 | 0 | |

[1] Blended feed was a mixture of raw water, recycled brine and recycled neutralized brine. This water was pumped to the reverse osmosis unit.
[2] Salt rejection percent=blended feed concentration minus product water concentration ×100 divided by blended feed concentration.

A second test was conducted, this time with the reverse osmosis unit operated at 82% water recovery.

The product water recovery was 98.7 or essentially the same as in the previous test. However, fouling of the membranes in the reverse osmosis unit seemed to be less than in the previous test and less flushing was necessary. The salt rejection was approximately 99% for all multivalent ions. The product water quality was better because a less concentrated feed water was introduced.

The details of Test II are tabulated below (Table VI):

TABLE VI.—SUMMARY OF TEST 2

NOTE:
Reverse osmosis unit water recovery, percent 82.
Total water recovery "neutrolosis" system, percent 97.7.
Pressure, p.s.i., 600.
Water temperature, ° F., 61.
Raw water flow, g.p.m., 4.83.
Product water flow, g.p.m., 4.77.
Brine water flow, g.p.m., 1.31.
Neutralized brine recycled, g.p.m., 1.25.
Average water flux, gal./sq. ft./day at 600 p.s.i. at 77° F., 12.3.
Length run, hours, 130.

|  | Raw water | Blended [1] feed | Brine | Neutralized brine recycled | Product | Salt [2] rejection, percent |
|---|---|---|---|---|---|---|
| Conductance, mmhos./cm | 1,660 | 3,000 | 5,640 | 2,500 | 213 | 93 |
| pH | 2.7 | 2.5 | 2.3 | 4.9 | 3.7 | |
| Acidity, mg./l | 585 | 1,150 | 2,430 | 175 | 36 | 97 |
| Alkalinity, mg./l | 0 | 0 | 0 | 7 | 0 | |
| Calcium, mg./l | 133 | 460 | 939 | 845 | 2 | 99 |
| Aluminum, mg./l | 43 | 91 | 189 | 30 | 1 | 99 |
| Iron, mg./l | 101 | 214 | 459 | 7 | 1 | 99 |
| Sulfate, mg./l | 1,340 | 3,010 | 6,380 | 3,490 | 18 | 99 |
| Magnesium, mg./l | 32 | 118 | 254 | 131 | 1 | 99 |

[1] Blended feed was a mixture of raw water, recycled brine, and recycled neutralized brine. This water was pumped to the reverse osmosis unit.
[2] Salt rejection percent=blended feed concentration minus product water concentration ×100 divided by blended feed concentrate.

What is claimed is:

1. A process for converting mineral contaminated waters to an essentially inert sludge and a purified product which comprises separating such waters by reverse osmosis into a purified product stream and a brine stream concentrated in mineral contaminants, thereafter chemically treating the brine stream to precipitate out mineral contaminants and recovering same as a sludge product, and recycling the chemically treated brine stream through reverse osmosis separation to recover therefrom additional purified product water.

2. The process of claim 1 wherein the recycled brine is admixed with incoming mineral contaminated water.

3. The process of claim 1 wherein the purified product stream contains at least 90% of the mineral contaminated entering waters.

4. The process of claim 1 wherein the mineral contaminated water is acid mine drainage and wherein the reverse osmosis is operated at an acid pH and the chemical treatment of the brine involves partial neutralization thereof.

5. The process of claim 4 wherein the acid mine drainage is preliminarily oxidized to convert ferrous salts therein to ferric salts.

6. The process of claim 5 wherein the brine stream is neutralized to a pH level of about pH-4.5.

7. The process of claim 6 wherein at least about 98% of the acid mine drainage water is recovered in the purified product stream.

8. The process of claim 1 wherein the mineral contaminated waters and the recycled brine are filtered prior to reverse osmosis separation thereof.

9. The process of claim 1 wherein a portion of the brine stream leaving the reverse osmosis separation is recycled directly back through reverse osmosis separation.

10. A process for separating acid mine drainage waters into a purified water product and an essentially inert sludge product which comprises passing the acid mine drainage waters and a partially neutralized recycled brine through reverse osmosis separation, thereby separating the acid mine drainage waters and recycled brine into a purified product stream and a brine stream, said reverse osmosis separation recovering in the purified product stream at least about 90% of the acid mine drainage water, chemically treating the brine stream to partially neutralize same and to precipitate out mineral matter, recovering the precipitate as a sludge product, the partially neutralized brine becoming the recycled brine passed through reverse osmosis separation.

11. The process of claim 10 wherein the acid mine drainage waters are preliminarily oxidized to convert any ferrous salts therein to ferric salts.

12. The process of claim 1 wherein the entering water is preliminarily disinfected.

13. The process of claim 1 wherein prior to recycle thereof the chemically treated brine is oxidized to convert ferrous ions to ferric ions.

14. The process of claim 10 wherein the acid mine drainage waters are preliminarily disinfected.

15. The process of claim 10 wherein prior to recycle thereof the partially neutralized brine is oxidized to convert ferrous ions to ferric ions.

References Cited
UNITED STATES PATENTS

| | | | |
|---|---|---|---|
| 3,494,465 | 2/1970 | Nyrop | 210—194 |
| 3,505,216 | 4/1970 | Kryzer | 210—23 |
| 3,133,132 | 5/1964 | Loeb et al. | 210—23 X |
| 3,228,877 | 1/1966 | Mahon | 210—321 X |
| 3,355,382 | 11/1967 | Huntington | 210—321 X |
| 3,550,782 | 12/1970 | Veloz | 210—321 X |
| 3,347,787 | 10/1967 | Rhodes | 210—63 |
| 3,284,351 | 11/1966 | Dajani | 210—63 |
| 3,403,099 | 9/1968 | Dixon | 210—63 |
| 3,684,094 | 8/1972 | Chamberlin | 210—321 |
| 3,342,728 | 9/1967 | Malmetal | 210—23 |

FRANK A. SPEAR, Jr., Primary Examiner

R. BARNES, Assistant Examiner

U.S. Cl. X.R.

210—51, 63, 64